United States Patent [19]

Gellert

[11] Patent Number: 5,284,436
[45] Date of Patent: Feb. 8, 1994

[54] INJECTION MOLDING TORPEDO WITH SHAFT HAVING CERAMIC CENTRAL PORTION

[76] Inventor: Jobst U. Gellert, 7A Prince Street, Georgetown, Ontario, Canada, L7G 2X1

[21] Appl. No.: 53,496

[22] Filed: Apr. 29, 1993

[51] Int. Cl.$^5$ .................................... B29C 45/20
[52] U.S. Cl. .................. 425/549; 264/328.15; 425/570; 425/572
[58] Field of Search .............. 425/549, 570, 572; 264/328.15

[56] References Cited

U.S. PATENT DOCUMENTS 4,450,999  5/1984  Gellert ........................... 425/549
4,771,164  9/1988  Gellert ........................... 425/549

Primary Examiner—Tim Heitbrink
Attorney, Agent, or Firm—Dalesman & Company

[57] ABSTRACT

Injection molding apparatus wherein a torpedo is mounted in the front end of a heated nozzle. The torpedo has spaced blades extending inwardly from an outer collar to an elongated shaft which extends centrally in the melt bore. The torpedo shaft has an elongated central portion which is securely press fitted in a steel outer sleeve from which the blades extend. The elongated central portion of the torpedo shaft extends forwardly into the gate, and is formed of an engineered ceramic such as silicon carbide which is very thermally conductive as well as abrasion and corrosion resistant. In one embodiment, the gate extends through a gate insert which is also formed of a thermally conductive and abrasion and corrosion resistant engineered ceramic material.

13 Claims, 3 Drawing Sheets

INJECTION MOLDING TORPEDO WITH SHAFT HAVING CERAMIC CENTRAL PORTION

BACKGROUND OF THE INVENTION

This invention relates generally to injection molding and more particularly to apparatus having a torpedo with a central shaft seated in the front end of a heated nozzle.

The use of torpedoes with conductive central shafts extending in the melt bore to enhance the thermodynamic cycle is well known. As seen in the applicants' U.S. Pat. No. 4,450,999 which issued May 29, 1984, it is also well known to make the torpedo shaft with an inner portion formed of a highly conductive metal such as copper covered by a protective casing formed of high speed steel. A torpedo having a similar shaft extending in alignment with a gate in a gate insert is shown in the applicants' U.S. Pat. No. 4,771,164 which issued Sep. 13, 1988. While these previous torpedoes have been successful for many applications, wearing of the shaft is a problem when the melt contains highly abrasive and corrosive materials such as ceramics, fiberglass, metals or minerals.

SUMMARY OF THE INVENTION

Accordingly, it is an object of the present invention to at least partially overcome the disadvantages of the prior art by providing injection molding apparatus which is more abrasive and corrosion resistant.

To this end, in one of its aspects, the invention provides injection molding apparatus comprising a heated nozzle seated in a well in a mold and a torpedo to convey melt to a gate, the nozzle having a rear end, a front end, a melt bore extending longitudinally therethrough from the rear end to the front end in alignment with the gate, and a seat extending around the melt bore at the front end of the nozzle, the torpedo having an outer collar, an elongated shaft extending centrally through the outer collar with an opening extending through the torpedo between the central shaft and the outer collar, and at least one support member extending across the opening between the central shaft and the outer collar, the outer collar being removably received in the seat at the front end of the nozzle with the opening through the torpedo aligned with the melt bore through the nozzle and the central shaft of the torpedo aligned with the gate, having the improvement wherein the elongated central shaft of the torpedo has an elongated central portion extending through an outer sleeve, the at least one support member extends outwardly from the outer sleeve to the outer collar, the central portion is secured in the outer sleeve to extend from the melt bore in alignment with the gate, and the central portion of the elongated shaft of the torpedo is formed of a thermally conductive engineered ceramic material.

Further objects and advantages of the invention will appear from the following description taken together with the accompanying drawings.

DETAILED DESCRIPTION OF THE INVENTION

Figure 1:
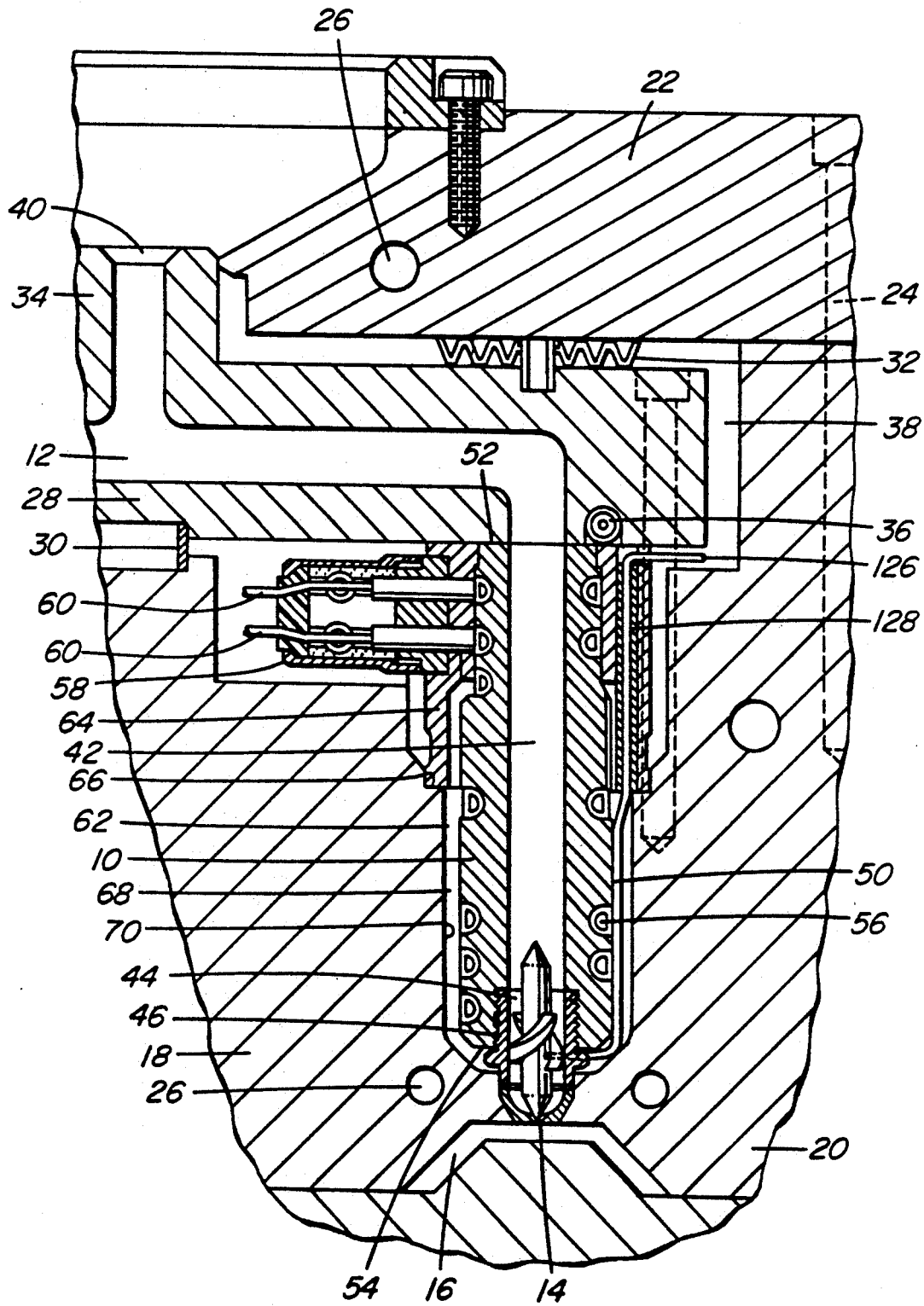
FIG. 1 is a partial sectional view of a portion of a multi-cavity injection molding system showing apparatus according to one embodiment of the invention.

Reference is first made to FIG. 1 which shows a portion of a multi-cavity injection molding system having several steel nozzles 10 to convey pressurized plastic melt through a melt passage 12 to respective gates 14 leading to different cavities 16 in the mold 18. In this particular configuration, the mold includes a cavity plate 20 and back plate 22 which are removably secured together by bolts 24. Other molds may include a variety of other plates or parts, depending upon the application. The mold 18 is cooled by pumping cooling water through cooling conduits 26 extending in the cavity plate 20 and the back plate 22. An electrically heated steel melt distribution manifold 28 is mounted between the cavity plate 20 and back plate 22 by a central locating ring 30 and insulative and resilient spacer members 32. The melt distribution manifold 28 has a cylindrical inlet portion 34 and is heated by an integral electrical heating element 36. An insulative air space 38 is provided between the heated manifold 28 and the surrounding cooled cavity plate 20 and back plate 22. The melt passage 12 extends from a central inlet 40 in the inlet portion 34 of the manifold 28 and branches outward in the manifold 28 to each nozzle 10 where it extends through a central melt bore 42 and then through an aligned opening 44 through a torpedo 46 to one of the gates 14 extending through a gate insert 48 seated in the mold 18 to a cavity 16.

Each nozzle 10 has an outer surface 50, a rear end 52, and a front end 54. The nozzle 10 is heated by an integral electrical heating element 56 which extends around the melt bore 42 to an external terminal 58 to which electrical leads 60 from a power source are connected. The nozzle 10 is seated in a well 62 in the cavity plate 20 with a cylindrical insulating and locating flange 64 extending forwardly to a circular locating shoulder 66 in the well 62. Thus, an insulative air space 68 is provided between the inner surface 70 of the well 62 and the outer surface 50 of the nozzle 10 to provide thermal separation between the heated nozzle 10 and the surrounding cooled mold 18.

Figure 2:
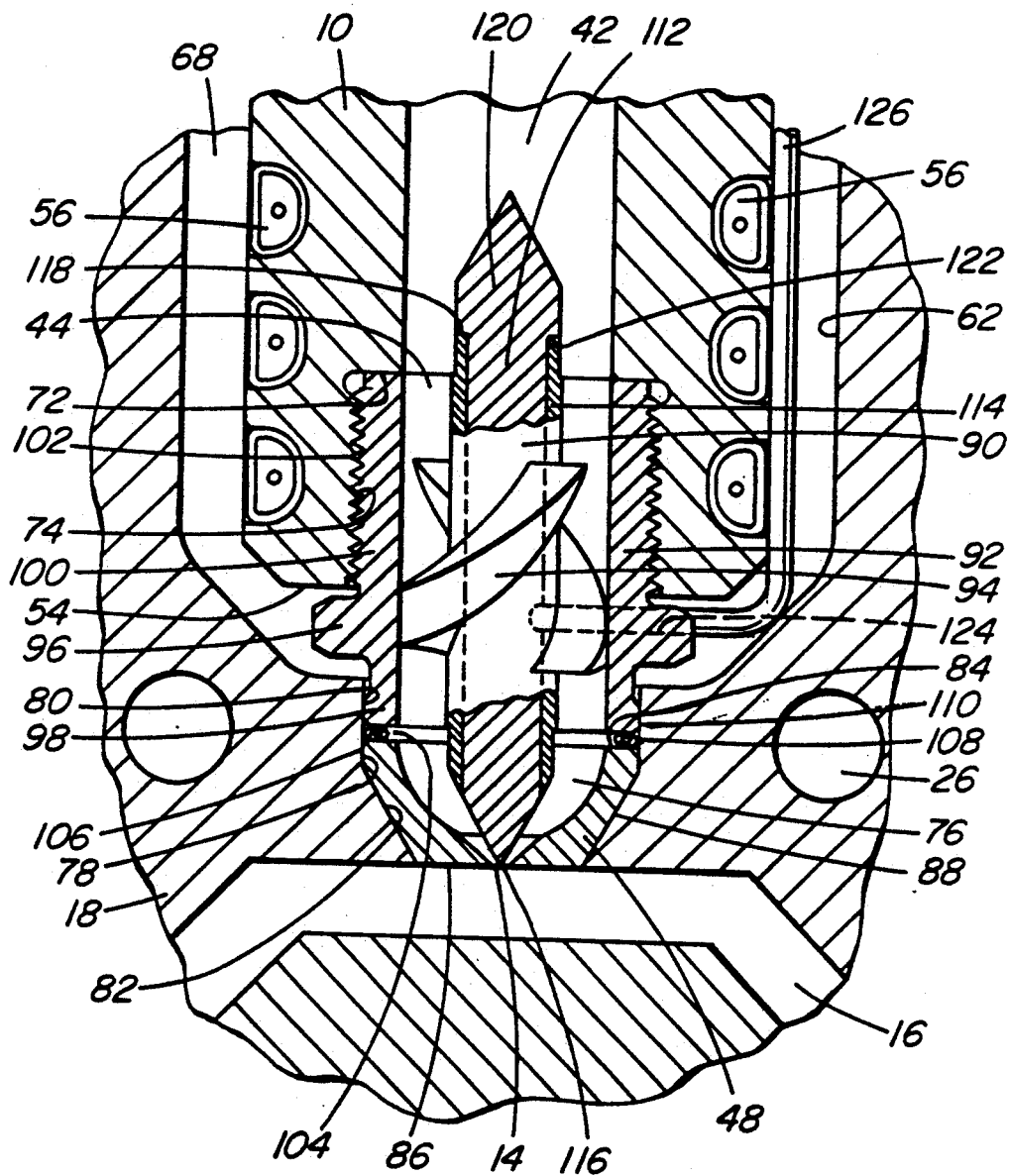
FIG. 2 is a larger cut-away view showing the shaft of the torpedo seen in FIG. 1.

As best seen in FIG. 2, the nozzle 10 has a seat 72 with a threaded inner surface 74 extending around the melt bore 42 at its front end 54. In this embodiment, an opening 76 extends through the mold 18 from the well 62 to the cavity 16. The surface 78 of opening 76 has a cylindrical rear portion 80 and an inwardly tapered forward portion 82. The gate insert 48 according to the invention is seated in the opening 76 with the gate 14 extending centrally therethrough to the cavity 16. The gate insert 48 has a rear end 84, a front surface 86 which faces the cavity 16 and an outer surface 88 which matches the surface 78 of the opening 76 through the mold 18. The gate insert 48 is formed of a thermally conductive engineered ceramic such as silicon carbide.

The torpedo 46 has an elongated central shaft 90 according to the invention which is described in more detail below. The elongated central shaft 90 extends longitudinally through an outer collar 92 with the opening 44 therebetween. In this embodiment, the central shaft 90 is connected to the outer collar 92 by a pair of spiral blades 94 extending across the opening 44, but in other embodiments one or more other support members such as pins or straight fins can be used instead. The outer collar 92 of the torpedo 46 has a hexagon shaped intermediate portion 96 extending between a cylindrical front portion 98 and a cylindrical rear portion 100 with a threaded outer surface 102. The rear portion 100 is screwed into the seat 72 extending around the melt bore 42 at the front end 54 of the nozzle 10, and the nozzle 10 is received in the well 62 with the front portion 98 of the outer collar 86 seated in the opening 76 through the mold 16. Screwing the torpedo 46 into the nozzle 10 has the advantage that it is secured in place with a small circular gap 104 provided between the forward end 106 of the outer collar 86 and the rear end 84 of the gate insert 48 to avoid damage to the gate insert 48 due to thermal expansion. In the embodiment, a hollow steel spacer ring 108 having a circular cross-section is mounted in the gap 104 to retain the gate insert 48 in place until molding commences. During the first injection cycle, the remainder of the gap 104 fills with melt which solidifies due to contact with the cooled mold 18 and holds the gate insert 48 in place. As can be seen, the spacer ring 108 may be deformed by thermal expansion to become slightly oblong. The torpedo 46 is easily removed by applying a wrench to the hexagonal intermediate portion 96 of the outer collar 92. Thus, the outer collar 92 of the torpedo 46 bridges the insulative air space 68 extending between the front end 54 of the nozzle 10 and the mold 18 and prevents pressurized melt escaping into the air space 68. A seal is provided between the outer surface 110 of the front portion 98 of the outer collar 92 and the surrounding cylindrical portion 80 of the surface 78 of the opening 76.

The elongated central shaft 90 of the torpedo 46 according to the invention has an elongated central portion 112 extending through an outer sleeve 114. The spiral blades 94 extend outwardly from the outer sleeve 114 which, in this embodiment, is made of tool steel. In this embodiment, the outer sleeve 114 is press fitted around the elongated central portion 112 to secure it in place extending from the melt bore 42 in alignment with the gate 14. Although the central portion 112 of the torpedo shaft 90 is shown with a pointed front tip 116 extending centrally into the gate 14 for hot tip gating, in another embodiment it may have an outwardly flared nose portion to provide fixed ring gating as described in the applicants' Canadian patent application serial no. 2091407 filed Mar. 10, 1993 entitled "Injection Molding Torpedo Providing Fixed Ring Gate". As can be seen, the central portion 112 of the torpedo shaft 90 extends rearwardly past the rear end 118 of the outer sleeve 114 and has a pointed rear end 120 facing upstream into the melt flowing through the melt bore 42. In this embodiment, the central portion 112 of the torpedo shaft 90 has an outwardly extending circular shoulder 122 which fits against the rear end 118 of the outer sleeve 114 to ensure it is secured in place against the force from the melt flow.

While the outer sleeve 114 of the torpedo shaft 90 is formed of tool steel which is corrosion and abrasion resistant, the elongated central portion 112 is formed of and engineered ceramic material such as silicon carbide which is very thermally conductive as well as being very corrosion and abrasion resistant. Other suitable engineered ceramic materials are boron carbide, silicon nitride, and zirconium oxide. This minimizes wear, particularly of the pointed front tip 116 around which the melt flow is accelerated to flow through the constricted gate, but also provides for direct rapid response to thermal requirements in the gate area during the thermodynamic cycle of the molding sequence. This structure of the torpedo shaft 90 provides the maximum exposure to the melt of the highly thermally conductive material 112 in the gate 14 without requiring a protective coating of a lesser wear and corrosion resistant material.

A thermocouple bore 124 extends radially inward into the torpedo 46 through the outer collar 92 and one of the spiral blades 94 to the central portion 112 of the shaft 90. A thermocouple element 126 is received in the thermocouple bore 124 to accurately monitor the operating temperature. The thermocouple element 126 extends rearwardly through the air space 68 and out through a hollow thermocouple tube 128. Thus, the thermocouple element 126 is easily removable, and in the event of leakage of melt into the air space 68, it will freeze off around the thermocouple element 126 in the thermocouple tube 128 to prevent leakage into the rest of the system.

In use, the injection molding system is assembled as shown in FIG. 1. While only a single cavity 16 has been shown for ease of illustration, it will be appreciated that the melt distribution manifold 28 normally has many more melt passage branches extending to numerous cavities 16 depending on the application. Electrical power is applied to the heating element 36 in the manifold 28 and to the heating elements 56 in the nozzles 10 to heat them to a predetermined operating temperature. Heat from the heating element 56 in each nozzle 10 is conducted forwardly through the elongated central portion 112 of the torpedo shaft 90 to the pointed front tip 116 extending into the gate 14. Pressurized melt from a molding machine (not shown) is then injected into the melt passage 12 through the common inlet 40 according to a predetermined cycle in a conventional manner. The pressurized melt flows through the melt bore 42 of each nozzle, through the opening 44 between the spiral blades 94 of the torpedo 46, and through the gate 14 to fill the cavity 16. The flow between the fixed spiral blades 94 imparts a swirling motion to the melt. This swirling motion is accelerated as the melt approaches the gate 14 and results in the melt flowing outward in the cavity 16 near the gate 14 with a curving motion. This avoids unidirectional molecular orientation of the melt, at least adjacent the gate, and provides a stronger product in the gate area. After the cavities 16 are filled, injection pressure is held momentarily to pack and then released. After a short cooling period, the mold is opened to eject the molded products. After ejection, the mold is closed and injection pressure is reapplied to refill the cavities 16. This injection cycle is continuously repeated with a frequency dependent on the size and shape of the cavities 16 and the type of material being molded.

During this repetitious injection cycle, heat is continuously transferred by the torpedo shaft 90 according to a thermodynamic cycle to control the viscosity of the melt in the gate 14. In some applications, sufficient heat is produced in the melt by the screw barrel of the injection machine and by shear as it is forced through the torpedo 46 and the constricted gate 14. Of course, the amount of heat generated by the melt flow can be varied by changing its velocity. In other applications, the heating elements 56 in the nozzles 10 are also used after start-up to provide additional heat to the melt. During injection, heat is transferred forwardly through the elongated central portion 112 of the torpedo shaft 90 to prevent excessive solidification of the melt in the area of the gate 14. When injection pressure is reapplied during injection, the central portion 112 of the torpedo shaft 90 conducts excess heat which is generated by the friction of the melt flowing through the constricted area of the gate 14 rearwardly to avoid stringing and drooling of the melt when the mold opens for ejection. After the melt has stopped flowing, solidification in the gate 14 is enhanced by the removal of excess friction heat rearwardly through the central portion 112 of the torpedo shaft 90. The size of the pointed front tip 116 of the central portion 112 of the torpedo shaft 90 which extends into the gate 14 is necessarily limited by the size of the gate 14 and the area required for the melt flow. Thus, the thermodynamic cycle is enhanced by this torpedo shaft structure which allows more of the highly conductive material to extend into the gate 14 without any of the space being taken up by a protective outer casing. The improved heat transfer provides faster solidification and reduces melt sticking to the molded product when the mold opens for ejection. Thus, cycle time is reduced and cosmetically cleaner gates are provided.

Figure 3:
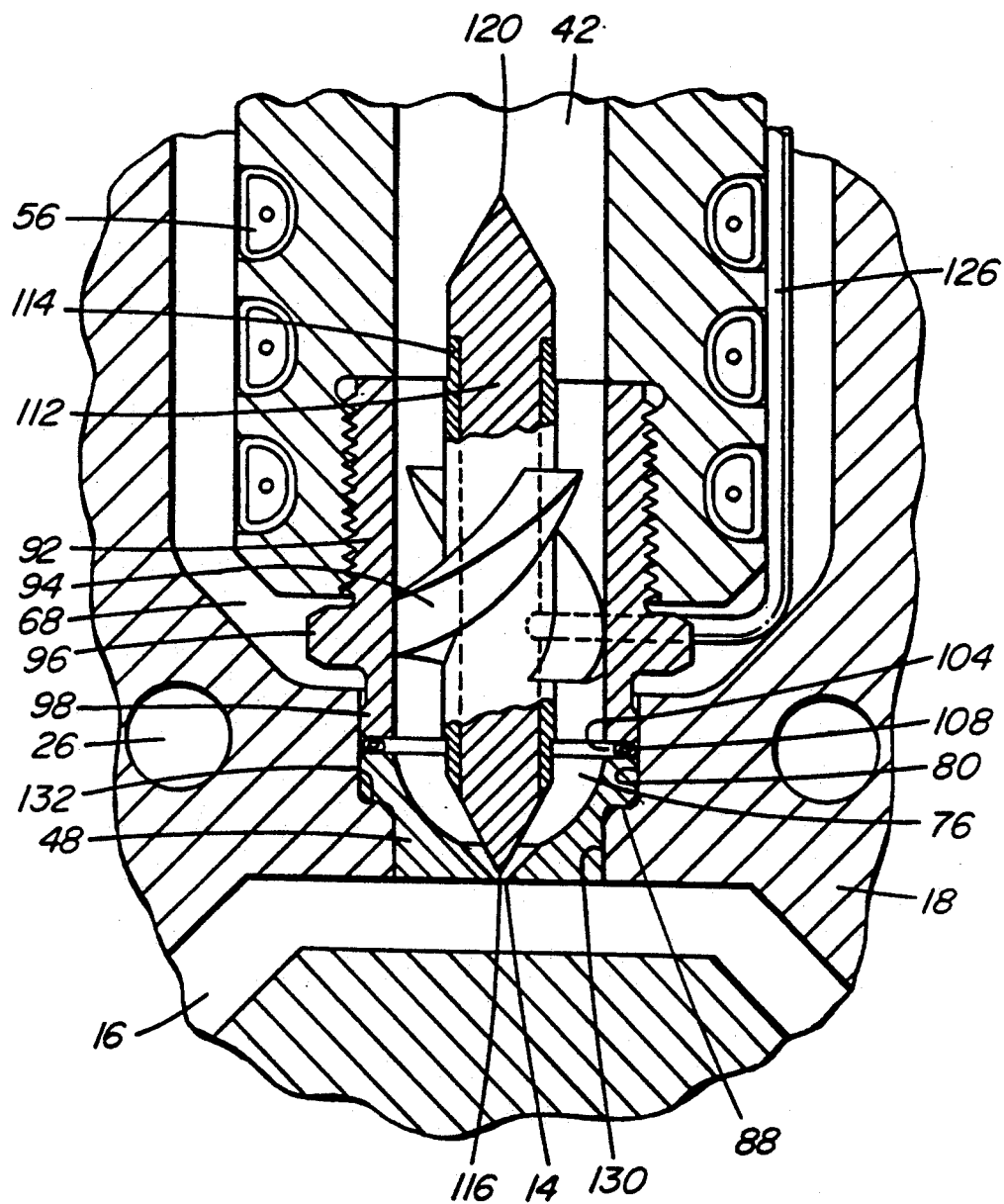
FIG. 3 is a similar view to FIG. 2 showing another embodiment of the invention.

Reference is now made to FIG. 3 to briefly describe another embodiment of the invention. As most of the elements are the same as those described above, common elements are described and illustrated using the same reference numerals. In this embodiment, the opening 76 extending through the mold 18 from the well has a cylindrical front portion 130 which is smaller in diameter than the cylindrical rear portion 80. Thus, a circular shoulder 132 is provided, against which the matching outer surface 88 of the gate insert 48 abuts. In both embodiments the area of the front surface 86 of the gate insert 48 facing the cavity 16 does not exceed the cross-sectional area of the melt bore 42. Thus, the rearward force from the pressure of the injected melt in the cavity 16 is not greater than the force from the melt in the gate insert 48, so the gate insert 48 is retained in place.

While the description of the injection molding apparatus according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus comprising a heated nozzle seated in a well in a mold and a torpedo to convey melt to a gate, the nozzle having a rear end, a front end, a melt bore extending longitudinally therethrough from the rear end to the front end in alignment with the gate, and a seat extending around the melt bore at the front end of the nozzle, the torpedo having an outer collar, an elongated shaft extending centrally through the outer collar with an opening extending through the torpedo between the central shaft and the outer collar, and at least one support member extending across the opening between the central shaft and the outer collar, the outer collar being removably received in the seat at the front end of the nozzle with the opening through the torpedo aligned with the melt bore through the nozzle and the central shaft of the torpedo aligned with the gate, the improvement wherein;

the elongated central shaft of the torpedo has an elongated central portion extending through an outer sleeve, the at least one support member extends outwardly from the outer sleeve to the outer collar, the central portion is secured in the outer sleeve to extend from the melt bore in alignment with the gate, and the central portion of the elongated shaft of the torpedo is formed of a thermally conductive engineered ceramic material.

2. Injection molding apparatus as claimed in claim 1 wherein the central portion of the elongated shaft of the torpedo has a pointed front tip extending centrally into the gate.

3. Injection molding apparatus as claimed in claim 2 wherein the outer collar, at least one support member, and the outer sleeve of the elongated shaft of the torpedo are formed of steel.

4. Injection molding apparatus as claimed in claim 3 wherein the at least one support member is at least one blade extending between the outer collar and the outer sleeve of the elongated shaft.

5. Injection molding apparatus as claimed in claim 4 wherein the outer sleeve of the elongated shaft of the torpedo has a rear end, and the central portion of the elongated shaft of the torpedo extends rearwardly past the rear end of the outer sleeve and has an outwardly extending circular shoulder abutting against the rear end of the outer sleeve.

6. Injection molding apparatus as claimed in claim 4 wherein the outer sleeve of the longitudinal shaft of the torpedo is securely press fitted around the central portion.

7. Injection molding apparatus as claimed in claim 4 wherein the engineered ceramic material is silicon carbide.

8. Injection molding apparatus as claimed in claim 4 wherein an opening extends centrally through the mold from the well to a cavity, the well in the mold has an inner surface, the nozzle is seated in the well in the mold with an insulative air space extending between the outer surface of the nozzle and the inner surface of the well, the outer collar of the torpedo has a cylindrical rear portion and a cylindrical front portion, the cylindrical rear portion of the outer collar being removably received in the seat at the front end of the nozzle and the cylindrical front portion of the outer collar being received in the opening extending from the well through the mold, whereby the outer collar bridges the insulative air space extending between the nozzle and the mold, and a gate insert is seated in the opening extending from the well through the mold, the gate insert has the gate extending therethrough to the cavity.

9. Injection molding apparatus as claimed in claim 8 wherein the gate insert is formed of a thermally conductive engineered ceramic material.

10. Injection molding apparatus as claimed in claim 9 wherein the engineered ceramic material is silicon carbide.

11. Injection molding apparatus as claimed in claim 9 wherein the gate insert has a rear end spaced a predetermined distance from the front portion of the torpedo to provide a circular gap therebetween, and a spacer ring is mounted in the gap between the rear end of the gate insert and the front portion of the torpedo.

12. Injection molding apparatus as claimed in claim 11 wherein the spacer ring has a circular cross-section.

13. Injection molding apparatus as claimed in claim 12 wherein the spacer ring is formed of steel.

* * * * *